(12) United States Patent
Windorfer et al.

(10) Patent No.: US 7,302,953 B2
(45) Date of Patent: Dec. 4, 2007

(54) BUILT-IN ASHTRAY FOR A MOTOR VEHICLE AND METHOD OF MAKING SAME

(75) Inventors: Martin Windorfer, Ditzingen (DE); Michael Pandura, Weinsberg (DE); Rainer Kuhlmann, Bietigheim-Bissingen (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 630 days.

(21) Appl. No.: 10/667,889

(22) Filed: Sep. 23, 2003

(65) Prior Publication Data

US 2004/0134503 A1    Jul. 15, 2004

(30) Foreign Application Priority Data

Sep. 23, 2002    (DE)    ................. 102 44 314

(51) Int. Cl.
  *B60N 3/08*    (2006.01)
  *A24F 19/00*    (2006.01)

(52) U.S. Cl. ..................... 131/231; 296/37.9
(58) Field of Classification Search ............. 131/231; 296/37.9; 206/120, 125
  See application file for complete search history.

(56) References Cited

U.S. PATENT DOCUMENTS

| | | | | |
|---|---|---|---|---|
| 1,983,382 A | * | 12/1934 | Marsh ................. | 132/287 |
| 2,930,390 A | * | 3/1960 | Whitehead, Jr. ....... | 137/85 |
| 5,060,899 A | * | 10/1991 | Lorence et al. ........ | 248/311.2 |
| 5,482,100 A | * | 1/1996 | Kuhar ................. | 160/170 |
| 6,129,218 A | * | 10/2000 | Henry et al. .......... | 211/59.3 |
| 2002/0030060 A1 | * | 3/2002 | Kaupp ................ | 220/737 |

FOREIGN PATENT DOCUMENTS

| | | |
|---|---|---|
| DE | 3811340 C2 | 7/1994 |
| DE | 196 53 302 | 6/1998 |
| JP | 5-38973 | 2/1993 |

OTHER PUBLICATIONS

English translation of DE 19653302 A1, Schreiber Translations, Inc.*

* cited by examiner

*Primary Examiner*—Steven P. Griffin
*Assistant Examiner*—Dennis R. Cordray
(74) *Attorney, Agent, or Firm*—Crowell & Moring LLP

(57) ABSTRACT

In a built-in ashtray, when the cigarette lighter is fitted into a swiveled-up holder, without any special locking mechanism for the holder, an automatic sliding of the ashtray into its closed position is avoided. A spring has a progressive characteristic spring curve such that the spring force, which acts upon the ashtray in its moved-out operative position and presses the ashtray toward the outside, is greater than the oppositely directed force component of the operating force acting in the plane of the spring force during the inserting or operating of the cigarette lighter.

10 Claims, 6 Drawing Sheets

BUILT-IN ASHTRAY FOR A MOTOR VEHICLE AND METHOD OF MAKING SAME

BACKGROUND AND SUMMARY OF THE INVENTION

This application claims the priority of German patent document 102 44 314.9, filed 23 Sep. 2002, the disclosure of which is expressly incorporated by reference herein.

The invention relates to a built-in ashtray for a motor vehicle. Certain preferred embodiments of the invention relate to a built-in ashtray for a motor vehicle, having a housing which has a guide by means of which an ashtray is displaceably in a drawer-type manner disposed in the housing, and having a holder for a cigarette lighter which is mounted on the ashtray so that it can be moved into an operative position projecting upward from the ashtray, the built-in ashtray having a driving device which moves the holder during the displacement of the ashtray out of the housing into the operative position upward and, during the displacement into the housing, in a downward manner, and in that, between the housing and a rearward area of the ashtray, a spring is arranged which changes the ashtray after the release of the locking from a moved-in closed position into a moved-out operative position.

A built-in ashtray of this general type is known from German Patent Document DE 196 53 302 A1. The known built-in ashtray has a housing with a guide by means of which the ashtray is slidably disposed in a drawer-type manner in the housing. The ashtray also has a holder for a cigarette lighter which is mounted on the ashtray so that it can be moved from the ashtray into an operative position projecting upward from the ashtray. The built-in ashtray is provided with a driving device which, when the ashtray is displaced out of the housing, moves the holder upward into the operative position and, when the ashtray is displaced into the housing, moves the holder downward. Furthermore, a spring is arranged between the housing and a rearward area of the ashtray, which spring, after the release of a lock, changes the ashtray from the moved-in closed position into a moved-out operative position.

So that, when the cigarette lighter is fitted into the holder, no automatic sliding of the ashtray into its closed position takes place, a locking mechanism is provided which is formed by a connecting link guide and locks the holder in its upward-projecting operative position.

It is an object of the invention to take such measures at a built-in ashtray that, when the cigarette lighter is fitted into the swiveled-up holder, an automatic sliding of the ashtray into its closed position is reliably avoided also without any special locking mechanism for the holder.

According to the invention, this object is achieved by providing a built-in astray for a motor vehicle, having a housing which has a guide by means of which an ashtray is displaceably in a drawer-type manner disposed in the housing, and having a holder for a cigarette lighter which is mounted on the ashtray so that it can be moved into an operative position projecting upward from the ashtray, the built-in ashtray having a driving device which moves the holder during the displacement of the ashtray out of the housing into the operative position upward and, during the displacement into the housing, in a downward manner, and in that, between the housing and a rearward area of the ashtray, a spring is arranged which changes the ashtray after the release of the locking from a moved-in closed position into a moved-out operative position, wherein the spring has a progressive characteristic spring curve such that the spring force, which acts upon the ashtray in its moved-out operative position and presses the ashtray toward the outside, is greater than the oppositely directed force component of the operating force acting in the plane of the spring force during the inserting or operating of the cigarette lighter.

Important advantages achieved by means of certain preferred embodiments of the invention are that, as a result of the arrangement of a progressive spring between the ashtray and the housing, an automatic sliding of the ashtray into its closed position is avoided when the cigarette lighter is fitted into the swiveled-up holder without the arrangement of a holder-side locking mechanism. A band-type flat coil spring (rolled spring) produced from thin spring band steel is preferably used as the spring in certain preferred embodiments of the invention, in which case an end-side holding section of the band-type flat coil spring is fastened to a lower housing wall, while a rolled-together area facing away from the holding section is supported on a rearward-side cage-type receiving device of the ashtray.

According to certain preferred embodiments of the invention, the progressive spring is designed such that the spring force $F_F$ acting upon the ashtray in its moved-out operative position and pressing the ashtray toward the outside is greater than the oppositely directed force component $F_{ZH}$ of the operating force $F_Z$ acting in the plane of the spring force $F_F$ when the cigarette lighter is fitted in or operated.

As a result of the progressive design of the spring, an increased expenditure of force is required at the start of the closing operation of the ashtray. A folding-away of the holder for the cigarette lighter is thereby prevented. The progressive design of the spring is achieved according to certain preferred embodiments of the invention by a defined non-linear winding of the rolled spring; that is, in a certain area, the spring is wound more (smaller bending radius) than in another area.

A progressive spring may also be obtained according to certain preferred embodiments of the invention by the punching-out of the spring within defined areas. The spring force will then no longer act along the entire metal sheet band width.

The invention will be explained in detail in the following by means of an embodiment illustrated in the drawing.

Other objects, advantages and novel features of the present invention will become apparent from the following detailed description of the invention when considered in conjunction with the accompanying drawings.

DETAILED DESCRIPTION OF THE DRAWINGS

Figure 1:
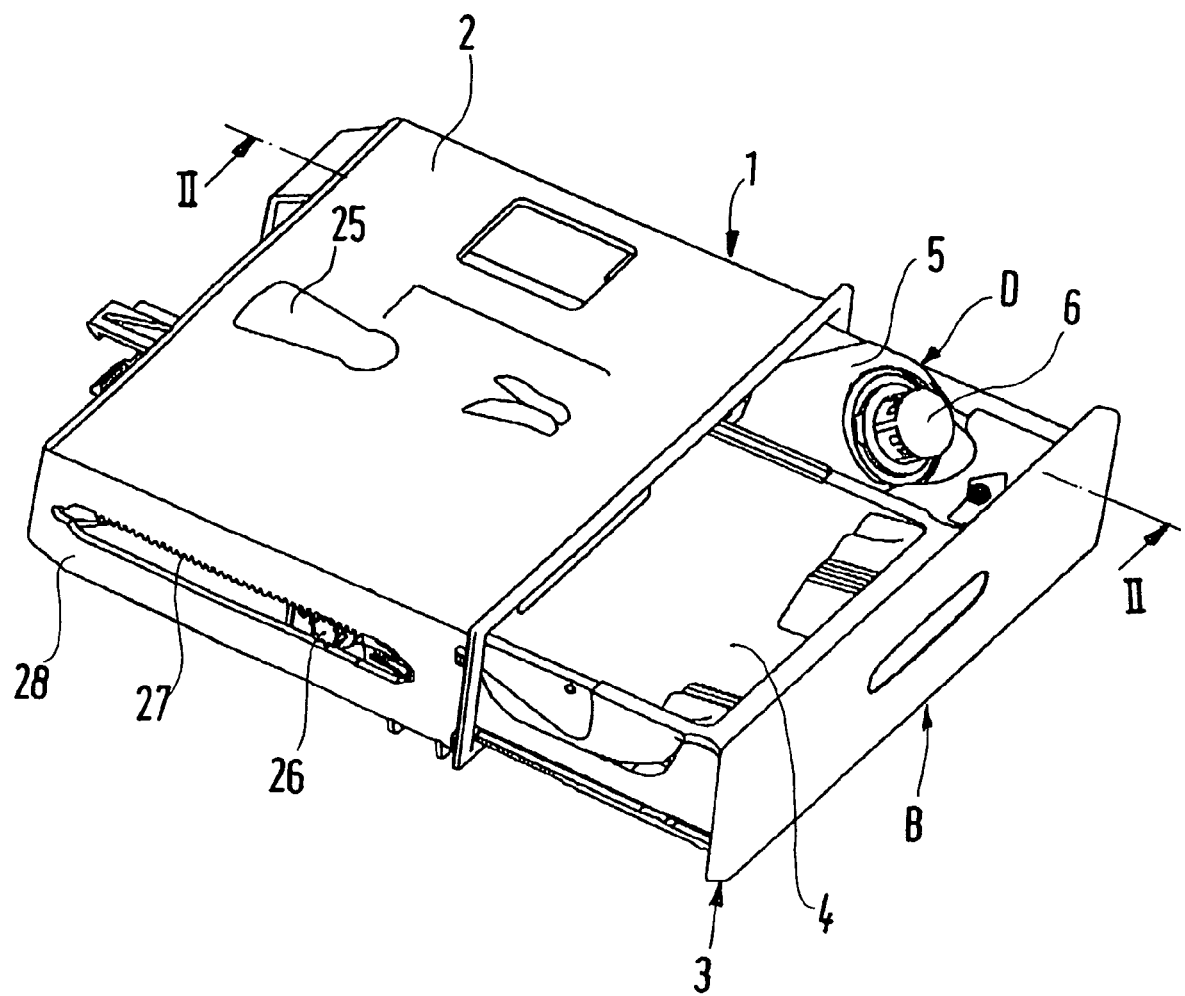
FIG. 1 is a perspective representation of a built-in ashtray constructed according to a preferred embodiment of the invention, shown in its moved-out operative position.

The ashtray 1, which is illustrated in FIG. 1 and can be built into a center console or a dashboard of a motor vehicle, comprises a housing 2 in which a box-shaped ashtray 3 can be displaced in a drawer-type manner. The ashtray interacts with the housing 2 by way of guides. According to FIG. 1, the ashtray 3 has an ash compartment 4 which is constructed so that it can be removed. Laterally next to the ash compartment 4, a holder 5 for a cigarette lighter 6 is swivelably disposed, which cigarette lighter 6 is fitted into the holder 5.

The ashtray 3 can be moved from a moved-in closed position A (FIG. 3) into a moved-out operative position B (FIG. 2) and vice-versa. When the ashtray 3 is pushed out of the housing 2, the holder 5 for the cigarette lighter 6 is swiveled in a restricted manner out of a basic position C lowered into the ashtray 3 into an operative position D which projects diagonally upward from the ashtray 3. When the ashtray 3 is pushed into the housing 2, the holder 5 for the cigarette lighter 6 is restrictedly moved from the diagonally upward standing operative position D downward into the lowered basic position C.

Figure 7:
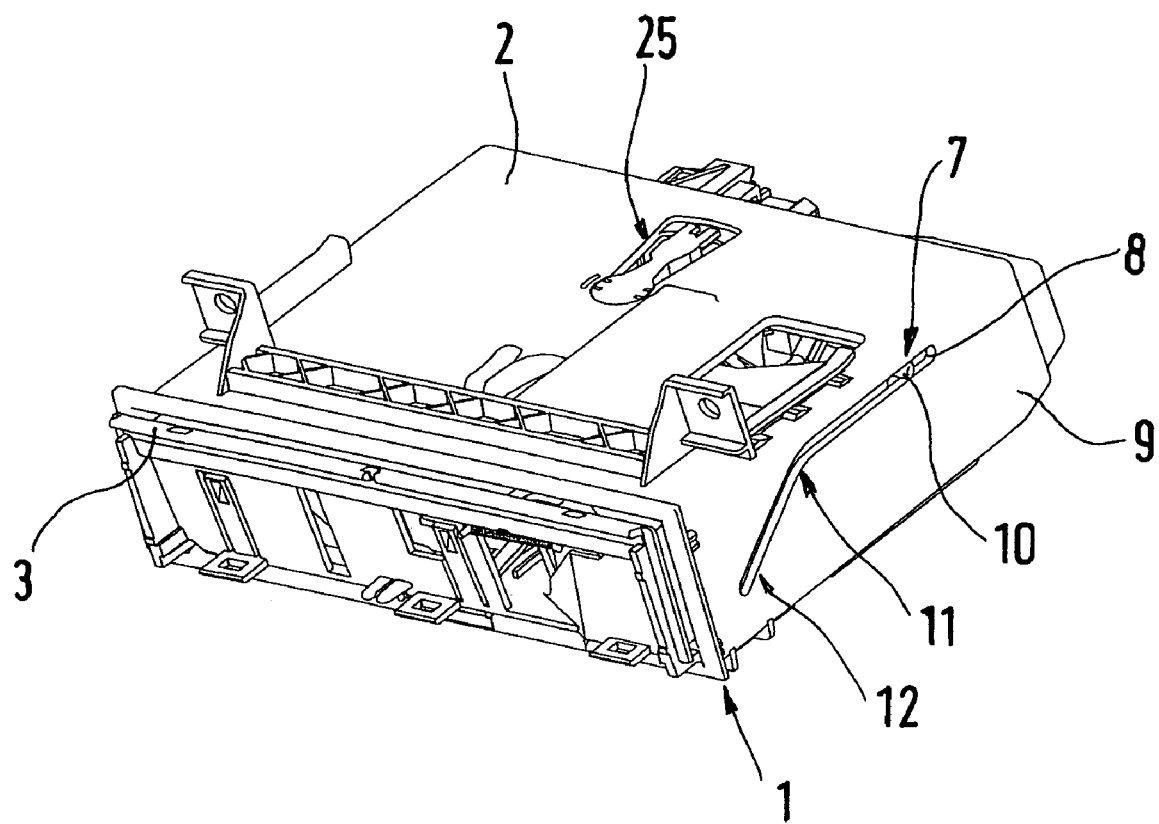
FIG. 7 is a perspective view diagonally from the front of the built-in ashtray of FIGS. 1-3, shown in the closed position.
Figure 8:
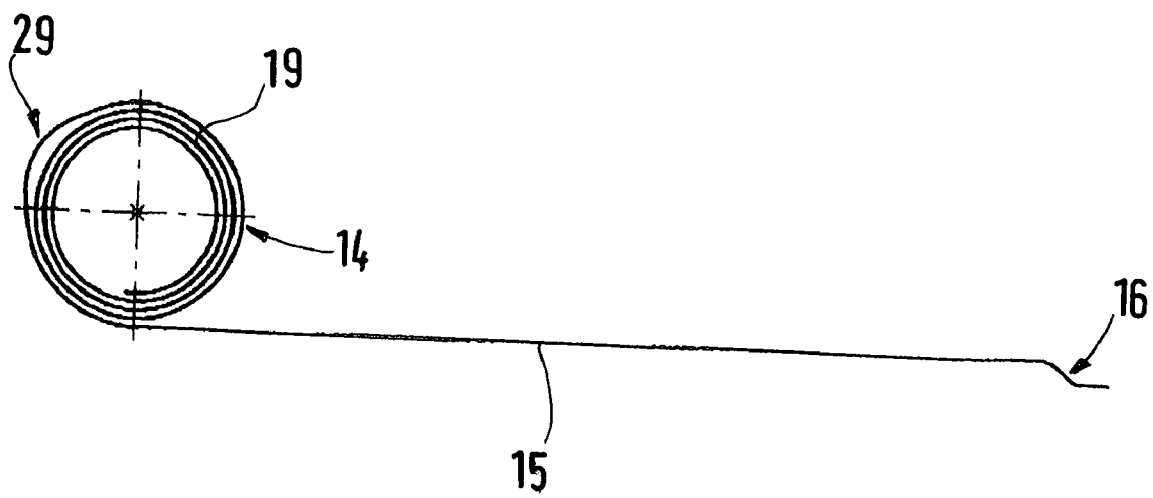
FIG. 8 is a lateral view of a first embodiment of the progressively constructed spring for use with the built-in astray of FIGS. 1-6.

For the restricted swiveling of the holder 5 as a function of the position of the ashtray 3, a driving device is provided which is constructed as a connecting link guide 7 in the embodiment shown (see FIG. 7). The connecting link guide 7 has a connecting link path 8 in the form of a slot in a side wall 9 of the housing 2 into which path 8 a connecting link pin 10 engages which forms one piece with the holder 5 and is laterally bent away at the rearward end of the holder 5 (FIG. 7). The connecting link path 8 extends essentially in the displacing direction of the ashtray 3 in the side wall 9 of the housing 2 from the rear to the front. The connecting link path 8 is bent in its center area 11; in its forward area 12, it extends diagonally toward the front bottom. When the ashtray 3 is displaced from the closed position A illustrated in FIG. 3 into the operative position B illustrated in FIG. 2, the connecting link pin 10 of the holder 5 moves in the connecting link path 8. In this case, the connecting link pin 10 in the forward diagonally downward extending area 12 of the curved path 8 is moved downward. The holder 5 swivels about its transversely extending, approximately horizontally oriented axis of rotation 13; a rearward part of the holder 5 moves downward; and its forward part containing the cigarette lighter 6 swivels into the operative position D (FIG. 2) disposed diagonally upward from the ashtray 3.

Figure 4:
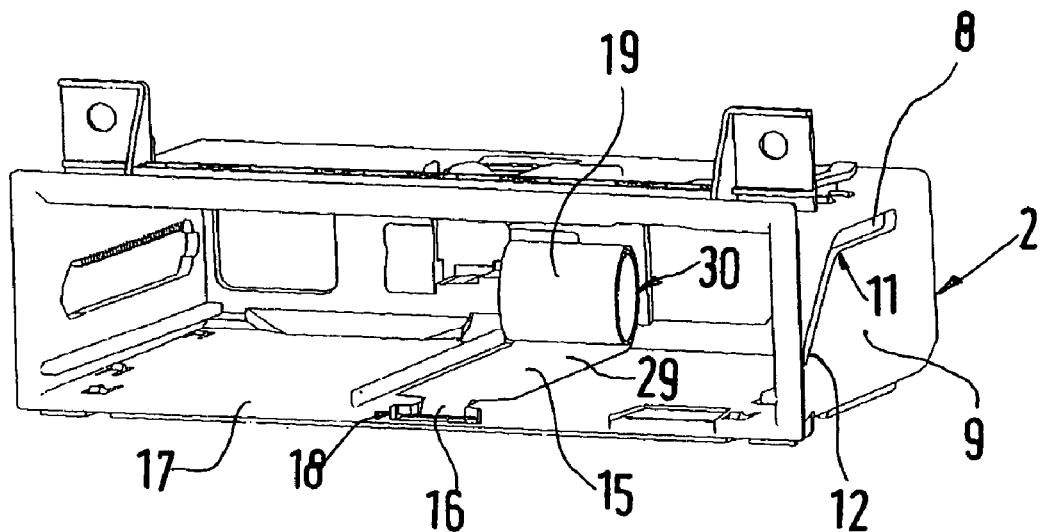
FIG. 4 is a perspective frontal view of the housing and spring of the built-in ashtray of FIGS. 1-3.
Figure 5:
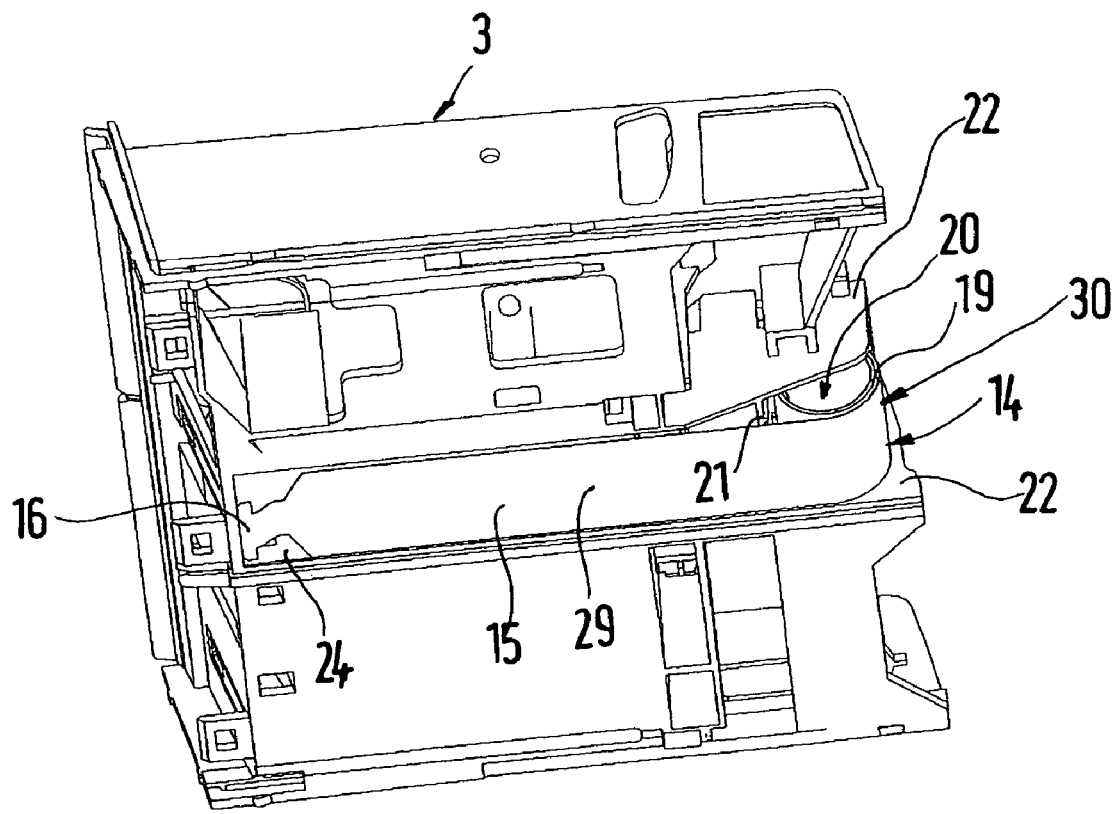
FIG. 5 is a perspective view from below of the ashtray and the spring of FIGS. 1-3, but without showing the housing.

For assisting the opening movement of the ashtray 3, a spring 14 is provided which, on the one side, is in an operative connection with the housing 2 and, on the other side, is in an operative connection with the ashtray 3. In the embodiment shown, the spring 14 is constructed as a band-type flat coil spring 15. An end-side bent holding section 16 of the band-type flat coil spring 14 is hung into a receiving device 18 constructed on the forward edge area of the lower housing wall 17 (FIG. 4). The bent, approximately T-shaped holding section 16 is adjoined by several rolled-up windings 19 of the band-type flat coil spring 15, the windings 19 interacting in a supporting manner with a rearward-side, cage-type receiving device 20 of the ashtray 3. The cage-type receiving device 20 is formed by a rearward, transversely extending boundary wall 21, by two longitudinally extending lateral walls 22 and by an upper boundary wall 23 equipped with downward projecting reinforcing ribs. The two lateral walls 22 are used as a guide of the band-type flat coil spring 15 in the transverse direction of the vehicle. A recessed guideway 24 for the band-type flat coil spring 15 is constructed at the underside of the ashtray 3 adjacent to the receiving device 20 (FIG. 5). The band-type flat coil spring 15, which extends in the longitudinal direction of the vehicle and is made of spring steel, extends between the top side of the lower housing wall 17 and the bottom side of the drawer-type ashtray 3 and has a small wall thickness. In the delivery condition, the band-type flat coil spring 15 is completely rolled up; only the end-side T-shaped holding section 16 projects away from the three to four rolled-together windings 19 (not shown in detail).

Figure 2:
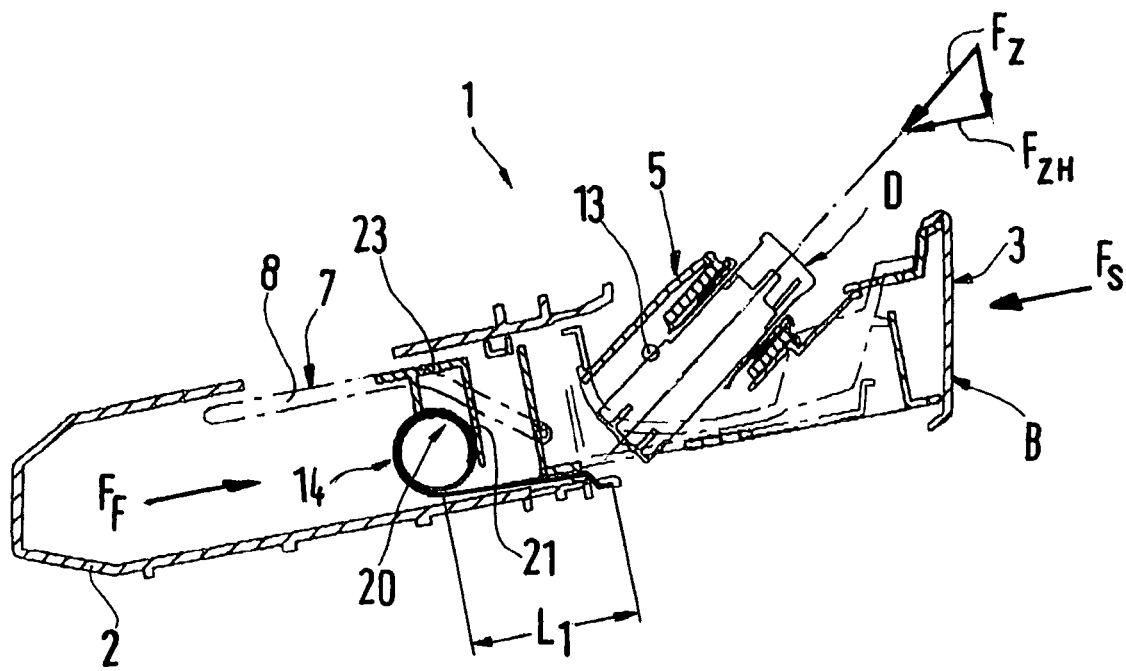
FIG. 2 is a sectional view taken along Line II-II of FIG. 1 and showing the moved-out operative position of the ashtray.
Figure 3:
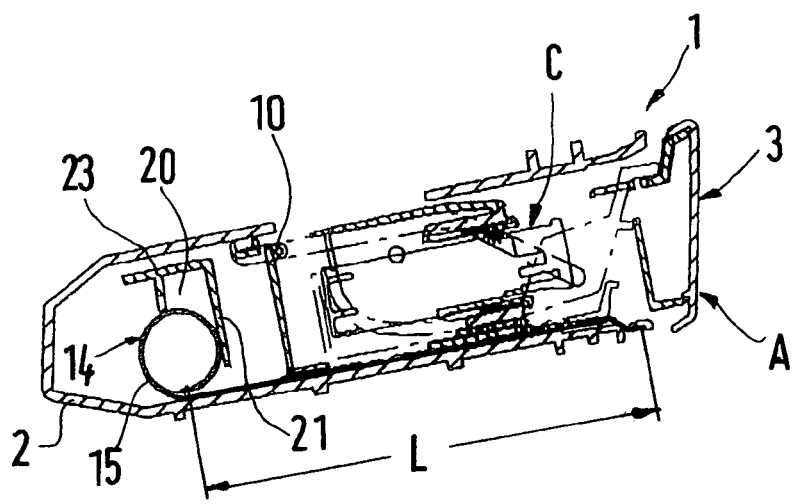
FIG. 3 is a sectional view similar to FIG. 2, showing the closed position of the ashtray.

In the closed position A of the ashtray 3, the band-type flat coil spring 15 has a relatively long, stretched-out area (length L) and relatively few windings 19 (FIG. 3). In contrast, in the moved-out operative position B, the stretched-out area is relatively short (length L1) and the band-type flat coil spring 15 instead has several windings 19 (FIG. 2). The ashtray 3 is fixed in its closed position A by way of a known cardioid curve control 25, which is not described in detail. As a result of a brief pressing of the ashtray 3 into the housing 2, the ashtray 3 is unlocked, and the band-type flat coil spring 15 moves the ashtray 3 into its moved-put operative position B. The displacing movement of the ashtray 3 is damped by a rotation damping element 26 which is mounted laterally on the ashtray 3 and whose gearwheel meshes with a toothed rack 27 in a second side wall 28 of the housing 3 (FIG. 1).

According to the illustrated embodiments of the invention, it is provided that the spring 14 has a progressive characteristic spring curve such that the spring force $F_F$, which acts upon the ashtray 3 in its moved-out operative position B and presses the ashtray 3 toward the outside, is greater than the oppositely directed force component $F_{ZH}$ of the operating force $F_Z$ which acts in the plane of the spring force $F_F$ during the inserting or operating of the cigarette lighter 6. Furthermore, the spring force $F_F$ acting upon the ashtray 3 is initially greater out of the operative position B than during the subsequent movement of the ashtray 3 into the closed position A. As a result, it is ensured that, when the cigarette lighter 6 is inserted or operated, thus, in the case of a pressure against the holder 5, no matter in which direction, the ashtray 3 is not automatically moved into its moved-in closed position A.

Such a progressive characteristic spring curve is achieved in the embodiment shown in such a manner that the area 29 of the band-type flat coil spring 15 facing the hung-in holding section 16 is more curved; that is, has a smaller bending radius than the area 30 of the band-type flat coil spring 15 which follows.

Figure 9:
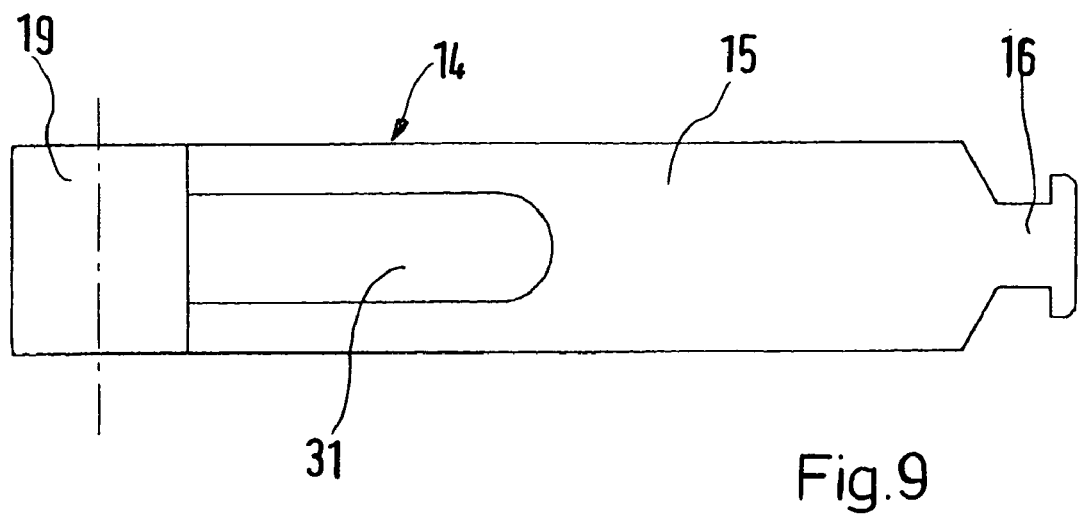
FIG. 9 is a top view of a second embodiment of a progressively constructed spring for use with the built-in astray of FIGS. 1-6.

A progressive design of the approximately 15 to 30 mm wide and thin-walled band-type flat coil spring 15 can be achieved in that the band-type flat coil spring 15 is provided within defined areas with at least one punched-out section 31 (FIG. 9). The spring force will then no longer act over the entire sheet metal band width.

Figure 6:
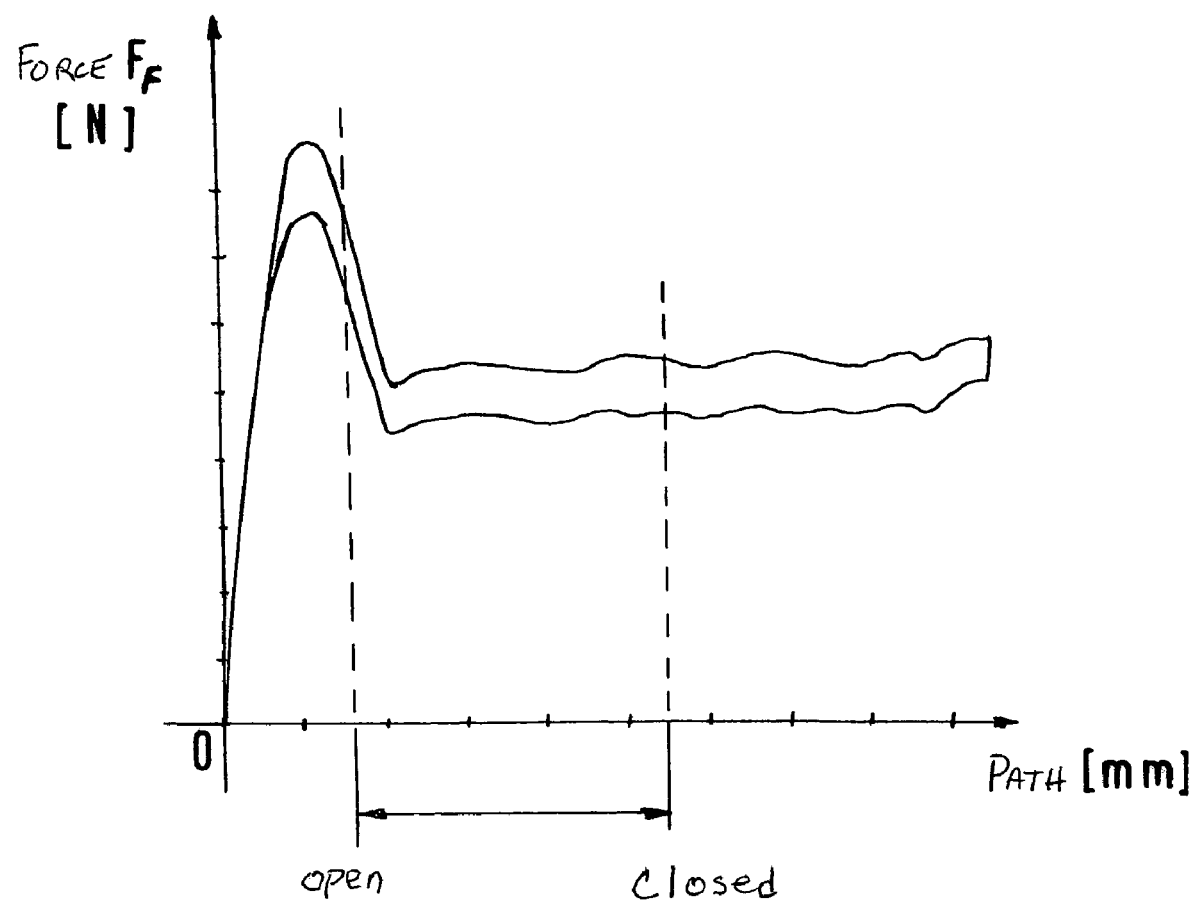
FIG. 6 is a force-path diagram of the progressively constructed spring for the built-in ashtray of the embodiments illustrated.

The force-path diagram illustrated in FIG. 6 shows that, when the ashtray 3 is open, caused by the band-type flat coil spring 15, a relatively high force $F_F$ acts upon the ashtray 3 in the opening direction; that is, a relatively high counterforce must be applied as the closing force $F_S$ in order to displace the ashtray 3 into its closed position A. After a defined path (approximately 20-30 mm) of the ashtray 3 movement in the direction of the closed position A, the force $F_F$ applied to the ashtray 3 by the progressive band-type flat coil spring 15 will decrease; that is, the required closing force $F_S$ will then also clearly decrease.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Built-in ashtray for a motor vehicle, having a housing having a guide via which an ashtray is displaceably moveable in a drawer-type manner in the housing into an open position, and having a holder for a cigarette lighter that is mounted on the ashtray so that it can be moved into an operative position projecting upward from the ashtray, the built-in ashtray having a driving device that moves the holder during the displacement of the ashtray out of the housing upward into the operative position and downward during the displacement into the housing and a spring operatively arranged between the housing and a rearward area of the ashtray such that the ashtray is changed after the release of the locking from a moved-in closed position into a moved-out operative position, wherein the spring is configured such that a spring force that acts upon the ashtray in its moved-out operative position and presses the ashtray out of the housing is greater than an oppositely directed force component of an operating force acting in a plane of the spring force during inserting or operating of the cigarette lighter.

2. Built-in ashtray according to claim 1, wherein the spring force is initially greater during movement of the ashtray into the closed position than during the subsequent movement of the ashtray into the closed position.

3. Built-in ashtray according to claim 1, wherein the spring is formed by a band-type flat coil spring made of a thin spring band, an end-side holding section of the band-type flat coil spring being fastened to a lower housing wall, whereas a rolled-together area with windings spaced from the holding section is supported in a rearward-side cage-type receiving device of the ashtray.

4. Built-in ashtray according to claim 3, wherein the area of the band-type flat coil spring at the end-side holding section has a smaller bending radius than the area of a following portion of the band-type flat coil spring.

5. Built-in ashtray according to claim 3, wherein the area of the band-type flat coil spring spaced from the end-side holding section is provided with at least one punched-out section.

6. Ashtray assembly for a passenger vehicle, comprising:

an ashtray housing, an ashtray displaceable in said housing between a closed and open position, a cigarette lighter holder carried by the ashtray and movable to a downward inoperative position when said ashtray is closed and to an upward operative position when said astray is open, and a spring disposed between the housing and ashtray and operable to assist movement of the ashtray toward the open position, wherein the spring is configured such that a spring force that acts upon the ashtray in its moved-out operative position and presses the ashtray outwardly of the housing, is greater than an oppositely directed force component of an operating force acting in a plane of the spring force during inserting or operating of the cigarette lighter.

7. Ashtray assembly according to claim 6, wherein the spring force is initially greater during movement of the ashtray into the closed position than during the subsequent movement of the ashtray into the closed position.

8. Ashtray assembly according to claim 1, wherein the spring is formed by a band-type flat coil spring made of a thin spring band, an end-side holding section of the band-type flat coil spring being fastened to a lower housing wall, whereas a rolled-together area with windings spaced from the holding section is supported in a rearward-side cage-type receiving device of the ashtray.

9. Ashtray assembly according to claim 8, wherein the area of the band-type flat coil spring at the end-side holding section has a smaller bending radius than the area of the band-type flat coil spring which follows.

10. Ashtray assembly according to claim 8, wherein the area of the band-type flat coil spring spaced from the end-side holding section is provided with at least one punched-out section.

* * * * *